UNITED STATES PATENT OFFICE.

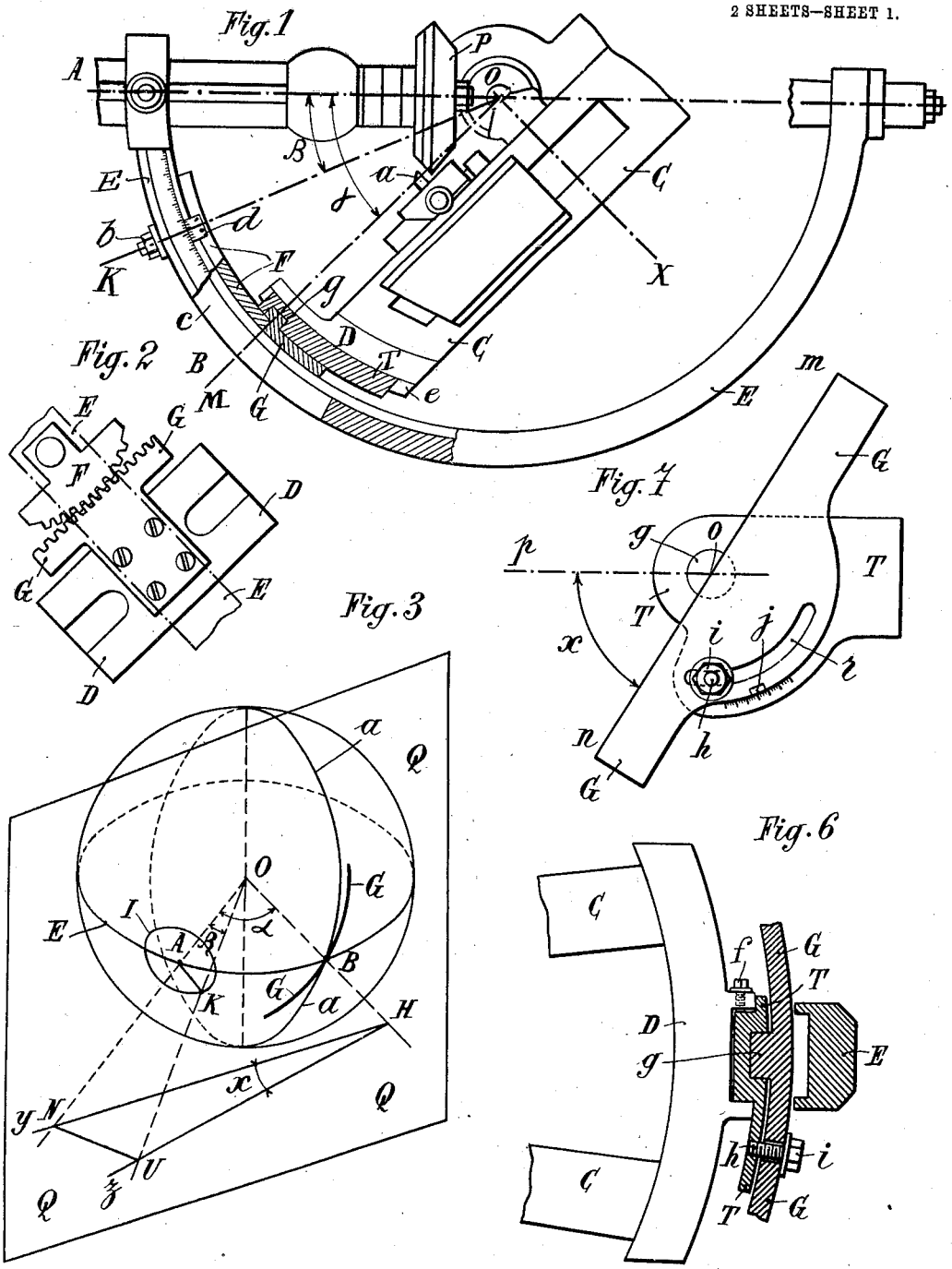

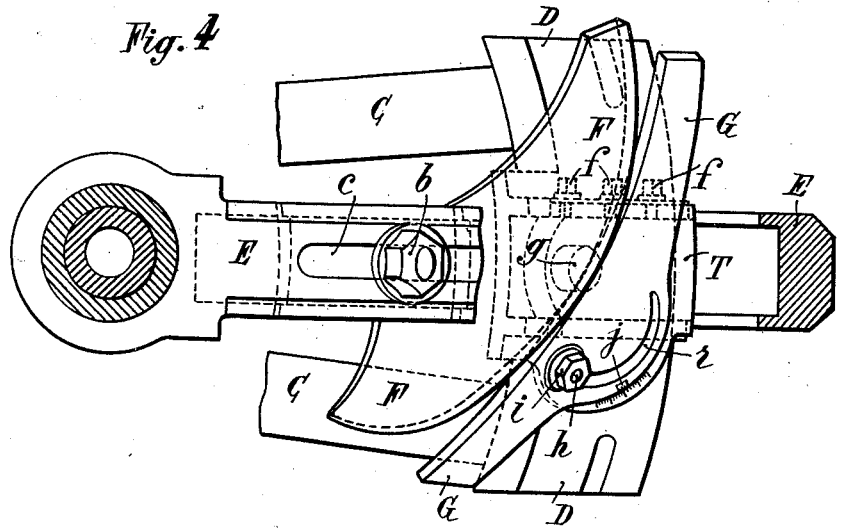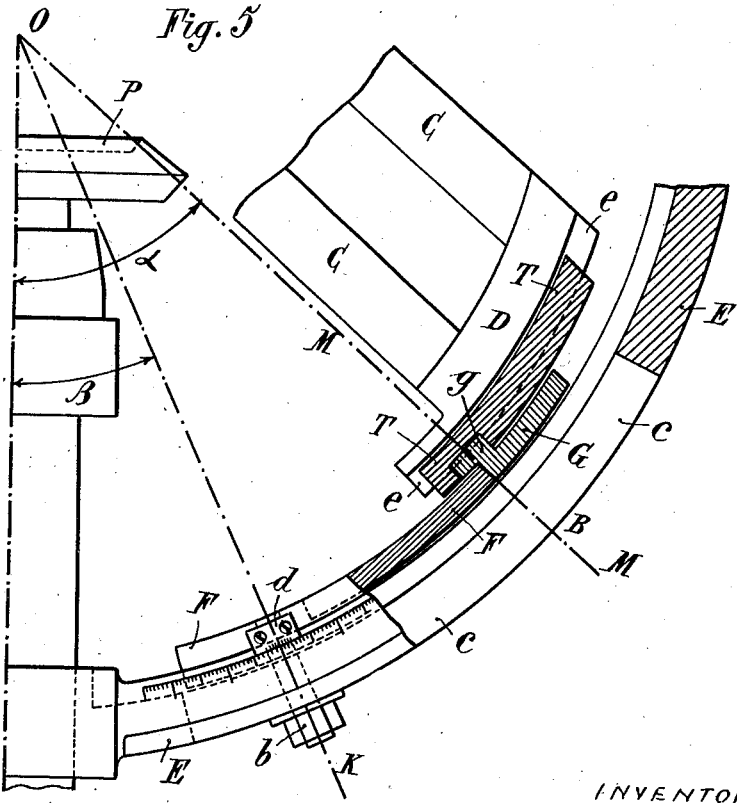

HENRI PERROT, OF CARDROSS, SCOTLAND.

MACHINE FOR CUTTING SPHERICAL INVOLUTE TEETH ON BEVEL-WHEELS.

1,088,174. Specification of Letters Patent. Patented Feb. 24, 1914.

Application filed March 29, 1912. Serial No. 687,264.

*To all whom it may concern:*

Be it known that I, HENRI PERROT, a citizen of the Republic of France, residing in Cardross, Dumbartonshire, Scotland, have invented certain new and useful Improvements in Machines for Cutting Spherical Involute Teeth on Bevel-Wheels, of which the following is a specification.

This invention has for object an improvement upon machines for cutting bevel gears, by means of which bevel gears can be cut with absolute precision.

Machines have already been devised wherein the gear to be cut is mounted upon a rotatable shaft and the cutter rotatably mounted in relation thereto in such manner that the cutter bears to the gear to be cut the relation of a segment of a spur gear meshing with said pinion. In said existing machines, only gears of a certain bevel angle can be accurately cut. Contrary to these prior machines the machine of the present invention permits of cutting with absolute precision bevel gears of any desired bevel angles, as will be readily understood from the following description reference being had to the accompanying drawings.

Figure 1 is a plan view, with parts in section, illustrating the principle of the present invention applied to a bevel gear cutting machine of the present type (the machine shown being of the Gleason type). Fig. 2 is a view illustrating certain details of existing machines. Fig. 3 is a diagram illustrating the principle of the invention. Fig. 4 is an end elevation, with parts broken away, of the structure shown in Fig. 1. Fig. 5 is a sectional plan of Fig. 1. Fig. 6 is a section on line M M of Fig. 5. Fig. 7 shows a detail in elevation.

Generally speaking a bevel wheel cutting machine consists essentially of two converging axles OA, OX the former of which carries the wheel or pinion P to be cut and the latter two slides C overlying each other and receiving the tools $a$ with straight flanks, the angle of the axles OA, OX varying according to the wheel to be cut. A transmission device causes the rotation of the shaft OA together with that of the wheel P to be cut, at the same time that it causes the rotation around the axis OX of the carriage D carrying the slides or tool carriers C. These two combined rotary motions are such that their angular displacements are the same as those that which would take place between the bevel wheel P to be cut and a crown wheel having O for its center (same being supposed represented by the tool $a$) if said wheels were meshing one with the other. This transmission device is constituted by a curved arm E pivoted at its two ends and carrying along in its rotation the bevel pinion P to be cut. On said arm E in existing machines is fixed a conical toothed sector F (Fig. 2) having the shape of a part of a bevel pinion of same bevel angle as that of pinion to be cut. On the slide or tool carrier C in said existing machines is mounted a part of a crown wheel G (Fig. 2) of same pitch as that of sector F and meshing with said sector. If the arm E is rotated it carries along the pinion P to be cut; the sector F causes the rotation of the crown wheel G around OX. This crown wheel G which is made fast upon the slide C imparts to the tool $a$ the same motion as if it was meshing with the pinion P. It will then be sufficient to give to the tools $a$ a reciprocating motion in the direction of line OB to enable said tools to cut out of the pinion all the material which occupies the place where would pass a tooth of another pinion meshing with pinion to be cut. But it will be readily understood that in order to obtain an accurate cutting of pinion P the sector F must be an accurate part of a bevel gear of same bevel angle as that of the gear to be cut. But as one is practically called upon to cut pinions of an infinite number of bevel angles, it would be necessary, in order that such a machine be perfect, to make use of an infinite number of bevel sectors such as F, which is practically impossible. As a rule the manufacturers supply the machine with about twenty sectors. It follows that gears of only twenty different sizes can be correctly cut, and that for all other sizes gears only approximately correct can be obtained.

The object of the present invention is to obviate these imperfections by enabling the use of one special sector only for accurately cutting an infinite number of pinions with bevel angles comprised within certain limits. It will then be possible by using a restricted number of sectors to cut accurately any bevel wheels of whatever bevel angle.

Let O be the center of a sphere (Fig. 3) a vertical medial circle $a$ of which represents the crown wheel with the tools as part thereof; in a horizontal medial circle E representing the arm which carries the sector F, let the radius OA be the axis of a cone with base I of a spherical involute; let β be the top angle of the cone and α the angle of line OA with line OB which is the intersecting line of the vertical medial circle $a$ with the horizontal circle E; α is the top angle of bevel pinion to be cut by means of the tools which form a part of the vertical medial circle $a$. If, through the line OB a plane BOK is drawn tangent to the cone having I for its base, said plane will be tangent along a generatrix OK and cut the sphere by a medial circle which is the locus of the points of contact of the two profiles, the teeth of the crown wheel having their flanks perpendicular to the same medial circle.

The angle formed between the tangent plane BOK and the horizontal plane OAB can be determined; if a plane Q be drawn from a point H perpendicularly to the intersection line OH of aforesaid planes BOK and OAB, the plane Q will cut the planes OAB and BOK by two lines H$y$ and H$z$, the angle $x$ of which gives the angle between the two planes. The intersecting point of OA with the plane Q is the point N on line H$y$ and that of OK with same plane Q is the point U on line H$z$. Let the points NU be joined and the angle $x$ in triangle HNU can be calculated. It will be observed that said triangle HNU is rectangular at U. Indeed the plane OHU being tangent to the cone is perpendicular to the plane ONU passing through the axis of said cone; on the other hand it has been drawn perpendicular to the plane Q. It is thus perpendicular to the intersection line NU of these two planes. Thus the line NU which is perpendicular to the plane OHU is perpendicular to any line such as HU drawn from the point U in the plane OHU.

In the rectangular triangle HNU:

$$NU = HN \sin. x$$

$$\sin. x = \frac{NU}{HN}$$

In the triangle ONU:

$$NU = ON \sin. \beta$$

and in triangle ONH:

$$NH = OH \tan. \alpha$$

Thus $$\sin. x = \frac{ON \times \sin. \beta}{OH \times \tan. \alpha}$$

Now in the triangle ONH which is rectangular at H:

$$OH = ON \cos. \alpha$$

or $$\frac{ON}{OH} = \frac{1}{\cos. \alpha}$$

Consequently $$\sin. x = \frac{\sin. \beta \times 1}{\tan. \alpha \times \cos. \alpha} = \frac{\sin. \beta}{\sin. \alpha}$$

β being the vertex angle of the cone having O for vertex and I for base, to obtain a certain pitch angle α for the pinion to be cut one will have simply to choose the angle $x$ so that $$\sin. x = \frac{\sin. \beta}{\sin. \alpha}$$

which is always possible. It will thus be readily understood that various angles α can be obtained for pinions mounted on the axle OA.

It will be observed that angle $x$ is the angle formed between a horizontal line HN and an inclined line HU located in a plane drawn from line OH tangent to the cone, the line HU being perpendicular to OH. It will be seen that the large or medial circle G (Fig. 3) passing through B and being in contact with the spherical involute of the base circle I of the cone is perpendicular to the plane BOK which is tangent to the cone; if projected on a vertical plane the projection of the large circle G on which rolls the involute will be an oblique line $mn$ (Fig. 7); that of the line OB which is located in plane of said large circle G and which is horizontal is a point O and that of line HN a horizontal line $pO$, angle $pOn$ being equal to angle $x$. Thus being given β which is the vertex angle of the cone having I for its base, if it be desired to cut a pinion with α as pitch angle one will first determine the angle $x$ formed between a horizontal plane drawn from the axis of the cone having β as vertex angle and a plane drawn tangent to said cone from a horizontal generatrix of pitch cone having same angle α as the pinion to be cut, said angle $x$ being such that $$\sin. x = \frac{\sin. \beta}{\sin. \alpha}$$

Thus in order to cut a pinion with α as vertex pitch angle one will have simply to incline the bar G on the horizontal line to an angle equal to the angle $x$, said bar G being formed as a part of large circle and then to bring it into contact with the cam F.

As represented in Figs. 1, 4 and 5 one has simply to mount upon the half-circle arm E, a cam F with spherical involute profile instead of the sectors F of the existing machines; said cam used for cutting bevel pinions with pitch angles comprised between two given angles is rigidly secured upon the arm E by a screw $b$ sliding in a slot $c$ provided in the arm E. On the latter is marked a graduation and each cam F is provided with a vernier $d$ (see Fig. 5) which allows placing the cams exactly on said arm E in accordance with the base circle of cone having the given vertex angle for which they have been constructed. On the back side of the carriage carrying the slides is made a slot $e$ in which moves a slide T (see plan Fig. 5 and section Fig. 6); said slide can be solidly fixed upon the support D by means of pressure screws $f$. In the slide T is bored a round hole for centering in which hole is adapted a correspondingly shaped pivot $g$ solidary of the bar G forming a flank of a rack and which is a part of a large circle. The bar G is provided with a circular slot $r$ (see Figs. 4 and 7) having as center the center of the pivot $g$; with said slot engages a pin $h$ fixed to the slide T, a nut $i$ being used for fixing the position of the bar G on its slide T. The slide T has divisions in degrees (see Fig. 7) facing which the bar G which carries a vernier $j$ may be moved.

The setting and starting of the machine are effected in the following manner: Let us assume that the pinion to be cut has a pitch vertex angle $\alpha$; the angle $90°-x$ which must be formed by the large rolling circle and a horizontal line will be reckoned, the horizontal line being constituted in the present case by the arm E; this angle $90°-x$ is such that $$\sin. x = \frac{\sin. \beta}{\sin. \alpha},$$

$\beta$ being the unvariable vertex angle of the cone whose base has been used to draw the spherical involute; the cam F is put once for all in position on the arm E which must be rigorously horizontal while setting. To that effect if the cone whose base has been used for drawing the spherical involute has a vertex angle equal to $\beta$, the cam F is placed by means of the vernier $d$ so as to face the corresponding division marked in degrees on the arm E, whereupon the bolt $b$ is screwed down.

While the arm E carrying the cam F, and the support for the slides C of the carriage supporting the tools are also rigorously horizontal, said carriage having been set so as to enable the tools to cut the pinion to be cut in a suitable manner, the nut $i$ will be unscrewed and the bar G will be inclined by rotation around its pivot $g$ until the zero of the vernier $j$ be facing one division of the graduation marked on the slide T, said division being such that $$\sin. x = \frac{\sin. \beta}{\sin. \alpha}$$

the angle $90°-x$ being the angle which will be formed by the bar G with the horizontal line, $\beta$ being the unvariable vertex angle of the cone of the spherical involute and $\alpha$ being the vertex angle of the bevel pinion to be cut. The inclination of the bar being set, the nut $i$ is screwed to render it solidary of the slide T.

In order to bring the bar G in the position which it must take, that is, to bring it into contact with the cam F, the pressure screws $f$ are unscrewed and the slide T is moved in the slot $e$ till the bar G is brought into contact with the cam F provided with a spherical involute profile. Then the pressure screws $f$ are screwed whereupon the machine is ready to work.

It will be readily understood that one cam only would be sufficient for cutting all bevel wheels whose vertex angles are comprised between 0 and 90 degrees; but such a cam would have too large a lever arm and the cantalever would therefore be too great in some cases. In practice a set of cams will be used each of which will permit to cut a number of pinions whose vertex angles are comprised within two extreme angles differing for say 10 degrees. Thus with a set of nine cams it will be possible to cut any bevel wheel whatever be its vertex angle.

Claims.

1. A machine for cutting bevel gears, comprising a rotatable mandrel adapted to carry a pinion to be cut, a tool carrier rotatable around an axis at an angle to that of said mandrel, and an involute cam moving with said rotatable mandrel against which said tool carrier is adapted to bear during its movement.

2. A machine for cutting bevel gears, comprising a rotatable mandrel adapted to carry a pinion to be cut, a tool carrier rotatable around an axis at an angle to that of said mandrel, an involute cam moving with said rotatable mandrel, and an adjustable bar upon said tool-carrier, against which said cam is adapted to bear during its movement.

3. A machine for cutting bevel gears, comprising a rotatable mandrel adapted to carry a pinion to be cut, an arm rotating with said mandrel, an involute cam carried by said arm, a tool carrier rotatable around an axis at an angle to that of said mandrel, and a bar adjustable to different degrees of inclination, upon said carrier against which said cam is adapted to bear during its movement.

4. A machine for cutting bevel gears, comprising a rotatable mandrel adapted to carry a pinion to be cut, an arm rotating with said mandrel, an involute cam carried by said arm, a tool-carrier rotatable around an axis at an angle to that of said mandrel, and a bar pivotally mounted upon said tool-carrier and adjustable to different degrees of inclination, said cam being adapted to bear against said bar.

5. A machine for cutting bevel gears, comprising a rotatable mandrel adapted to carry a pinion to be cut, an arm rotating with said mandrel, a cam adapted to be fixed on said arm having a surface corresponding to the involute of the base of a cone having a given vertex angle, a tool-carrier rotatable around an axis at an angle to that of said mandrel, a bar upon said tool-carrier against which said cam is adapted to bear, said bar having the outline of a circle and being adjustable upon said carrier and to different degrees of inclination.

6. A machine for cutting bevel gears, comprising a rotatable mandrel adapted to carry a pinion to be cut, an arm rotating with said mandrel, a cam adapted to be fixed on said arm having a surface corresponding to the involute of the base of a cone having a given vertex angle, a tool-carrier rotatable around an axis at an angle to that of said mandrel, a bar against which said cam is adapted to bear, and a slide adjustably mounted upon said tool-carrier, said bar having the outline of a circle and pivotally mounted upon said slide whereby it may be adjusted to different degrees of inclination.

In witness whereof, I have hereunto signed my name in the presence of two subscribing witnesses.

HENRI PERROT.

Witnesses:
 PETER BURT,
 GEO. H. FREEMAN.

---

Copies of this patent may be obtained for five cents each, by addressing the "Commissioner of Patents, Washington, D. C."